US008404200B2

(12) United States Patent
Vij

(10) Patent No.: US 8,404,200 B2
(45) Date of Patent: Mar. 26, 2013

(54) COLD SELECTIVE CATALYTIC REDUCTION

(75) Inventor: Anu Vij, Chino Hills, CA (US)

(73) Assignee: OnQuest, Inc., San Dimas, CA (US)

( * ) Notice: Subject to any disclaimer, the term of this patent is extended or adjusted under 35 U.S.C. 154(b) by 0 days.

(21) Appl. No.: 13/441,549

(22) Filed: Apr. 6, 2012

(65) Prior Publication Data

US 2012/0195802 A1 Aug. 2, 2012

Related U.S. Application Data

(63) Continuation of application No. 12/899,328, filed on Oct. 6, 2010, now Pat. No. 8,153,090.

(60) Provisional application No. 61/249,178, filed on Oct. 6, 2009.

(51) Int. Cl.
*B01D 53/34* (2006.01)
*B01D 53/74* (2006.01)
*F28D 17/00* (2006.01)

(52) U.S. Cl. .................. 423/210; 423/DIG. 6; 422/105; 422/168; 422/173; 422/175; 422/177; 422/180; 422/206

(58) Field of Classification Search .................. 422/105, 422/168, 173, 175, 177, 180, 206; 423/210, 423/DIG. 6
See application file for complete search history.

(56) References Cited

U.S. PATENT DOCUMENTS

| | | | |
|---|---|---|---|
| 5,024,817 A | 6/1991 | Mattison | |
| 5,262,131 A * | 11/1993 | Bayer et al. | ................... 422/175 |
| 5,366,708 A | 11/1994 | Matros et al. | |
| 5,589,142 A | 12/1996 | Gribbon | |
| 5,770,162 A | 6/1998 | Niknafs | |
| 5,891,411 A | 4/1999 | Gribbon | |
| 6,092,367 A | 7/2000 | Dolling | |
| 8,153,090 B2 * | 4/2012 | Vij | ................... 423/210 |
| 2008/0050297 A1 | 2/2008 | Harold et al. | |
| 2011/0081285 A1 | 4/2011 | Vij | |

FOREIGN PATENT DOCUMENTS

EP 0191441 A1 8/1986
WO 2011044250 A1 4/2011

OTHER PUBLICATIONS

PCT/US2010/051650 filed Oct. 6, 2010 Search Report and Written Opinion of the International Searching Authority dated Nov. 30, 2010.
U.S. Appl. No. 12/899,328, filed Oct. 6, 2010 Notice of Allowance dated Dec. 13, 2011.

* cited by examiner

*Primary Examiner* — Timothy Vanoy
(74) *Attorney, Agent, or Firm* — Rutan & Tucker, LLP

(57) ABSTRACT

A system to control the emissions of a fluid stream in a cyclical fashion utilizing an up-flow cycle and a down-flow cycle. The system may include a first inlet and a first outlet at a first end of the system and a second inlet and a second outlet at a second end of the system, a catalyst zone between the first end and second end, two heat transfer zones, at least one heat transfer zone positioned between the catalyst zone and the first end of the system and between the catalyst zone and the second end of the system, and two heating zones, at least one heating zone positioned between the catalyst zone and each of the at least one heat transfer zones. The symmetrical arrangement permits a bi-directional fluid cycle to recover a portion of the energy supplied to the system during each cycle.

20 Claims, 3 Drawing Sheets

COLD SELECTIVE CATALYTIC REDUCTION

PRIORITY

This application is a continuation of U.S. patent application Ser. No. 12/899,328, filed Oct. 6, 2010, now U.S. Pat. No. 8,153,090, which claims the benefit of U.S. Patent Application No. 61/249,178, filed Oct. 6, 2009, each of which is incorporated in its entirety by reference into this application.

BACKGROUND

Various industrial processes emit emissions containing undesirable pollutants like NOx, CO, VOCs and HAPs. These harmful pollutants may need to be removed from the flue gas before releasing into the atmosphere to meet the Environmental Protection Agency (EPA) requirements. Current technologies enabling industries to remove the pollutants include thermal oxidation (direct fired, recuperative or regenerative) and selective catalytic reduction.

Existing thermal oxidation technologies are limited to the removal of CO, VOCs and HAPs by heating the flue gas to a temperature greater than 1400 deg. F. Direct fired thermal oxidation has no heat recovery. Recuperative thermal oxidation may recover 60-80% of the heat required to heat the flue gas to a temperature greater than 1400 deg. F. Regenerative thermal oxidation may recover 85-95% of the heat required to heat the flue gas to a temperature greater than 1400 deg. F.

Existing selective catalytic reduction technologies are believed to be limited to the removal of NOx by either entry into the process system where the temperature is between 500 to 700 deg. F or heating the flue gas to a temperature between 500 to 700 deg. F. These technologies do not appear to be capable of removing NOx efficiently at a flue gas temperature of less than 480 deg. F.

Other potential limitations of the current selective catalytic reduction technologies include, but are not limited to: (1) issues of incorporation into systems where space is constrained close to the temperature zone between 480 to 700 deg. F; (2) revamps of existing systems are limited where turnaround times are not achievable unless the NOx removal product is only by a standalone tie-in; (3) multiple process streams resulting in fluctuating flue gas temperature from ambient to less than 480 deg. F.; and (4) catalyst plugging by the particulate matter in the flue gas.

SUMMARY OF THE INVENTION

A Cold Selective Catalytic Reduction (CSCR) system and method include selective catalytic reduction and regenerative thermal oxidation to enable removal of Nitrogen (NOx), carbon monoxide (CO), volatile organic compounds (VOCs) and hazardous air pollutants (HAPs) in a single chamber while achieving very high thermal efficiency. Embodiments as described herein include new, lower-temperature selective catalytic reduction systems that use regenerative heat exchange to minimize the amount of additional heat required during the oxidization process. Significant benefits may be obtained for thermal efficiency, as flue gases can be treated with low exhaust gas temperatures of about 200-300 deg. F., therefore allowing the thermal oxidization to take place after economizer or waste-heat recovery units.

Embodiments as described herein utilize a single chamber to optimize the catalyst, space and structural steel. For example, the CSCR system and method described herein may be a single cylindrical or rectangular chamber which may have inlet and outlet ducts directly coupled to the top and bottom of the chamber, respectively. Flue gas flow may be controlled using dampers/valves and induced draft fan/forced draft fan. From the bottom to top, the chamber may include one or more of the following components: (1) first heat transfer media section; (2) first ammonia distribution section and burners; (3) NOx, CO, VOCs and HAPs catalyst; (4) second ammonia distribution section and burners; and (5) second heat transfer media section. Catalyst used may be in single or multiple layers and may be selected depending on the pollutant constituents to be removed. Further, while a first and second heat transfer media are disclosed, it should be understood that a third, fourth or more heat transfer media section is within the scope of the invention. Further still, while a first and second ammonia distribution section and burners are disclosed, it should be understood that a third, fourth or more ammonia distribution section and burners is within the scope of the invention.

In one embodiment, the emissions containing pollutant is processed by the CSCR system in cyclical fashion utilizing an up-flow cycle and a down-flow cycle through the CSCR system. These alternating cycles may be repeated in time intervals, for example after every 1-10 minutes, in order to achieve optimal heat recovery. Final cycle time tuning is dependent on a number of variables, including the heat transfer media utilized, and can be field tested for optimization.

DETAILED DESCRIPTION

Figure 1:
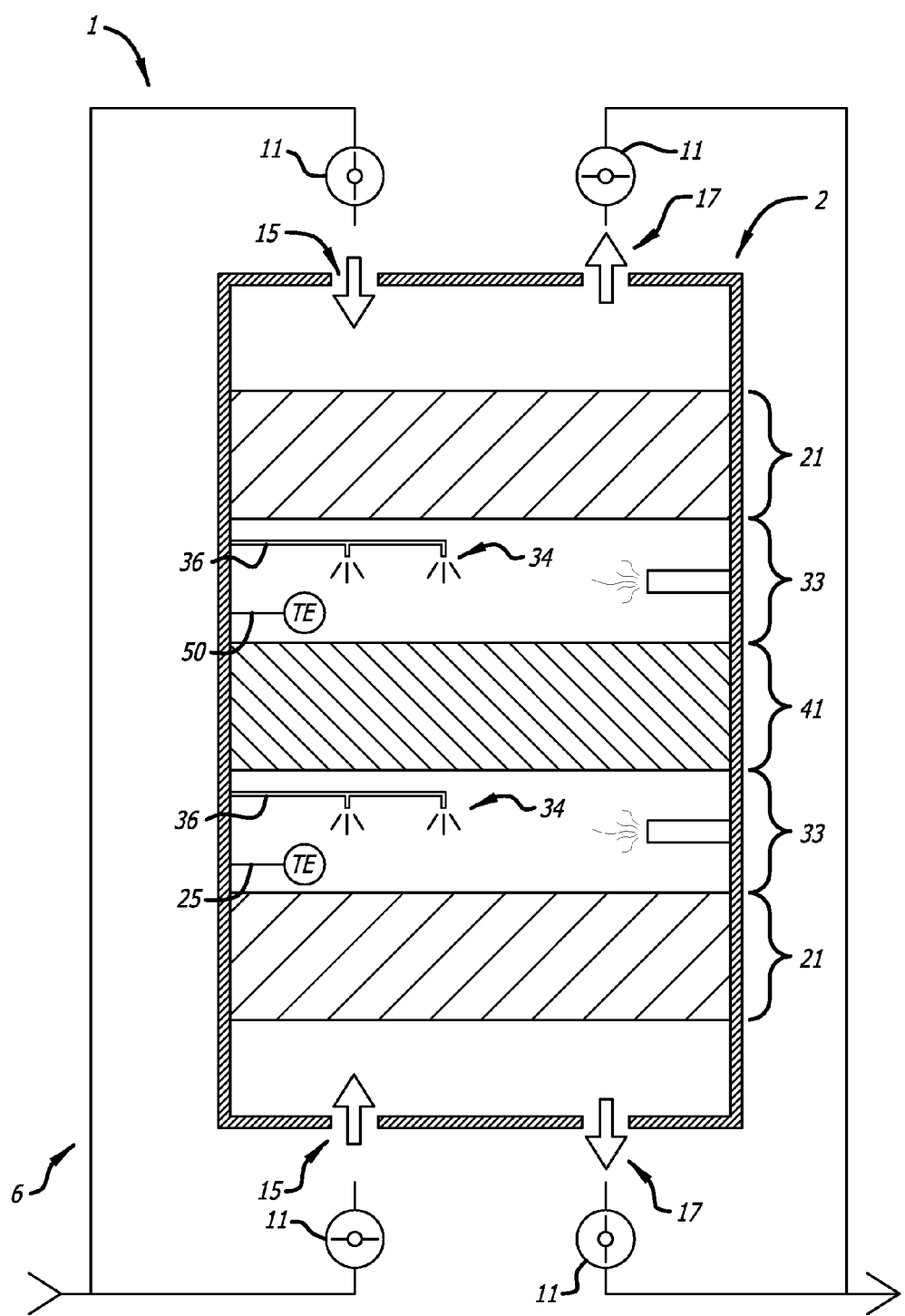
FIG. 1 illustrates a diagrammatic representation of a Cold Selective Catalytic Reduction system according to embodiments as described.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale. While examples are provided herein with respect to the removal of volatile organic compounds (VOCs), hazardous air pollutants (HAPs), carbon monoxide (CO), and oxides of Nitrogen (NOx) via a single chamber cold selective catalytic reduction system and method, it should be appreciated that the principles of the invention described herein may be applicable to other types of pollutants not specifically discussed herein. Further, embodiments as described herein may be combined to remove pollutants, as well as to recover heat.

Embodiments as described herein utilize a single chamber to optimize the catalyst, space and structural steel. For example, the CSCR system and method described herein may be a single cylindrical or rectangular chamber which may have inlet and outlet ducts directly coupled to the top and bottom of the chamber, respectively. The emissions containing pollutant, such as a flue gas, is processed by the CSCR system in cyclical fashion utilizing a bi-directional gas flow through the CSCR system permitting an up-flow cycle and a down-flow cycle.

In the up-flow cycle, the flue gas enters through the bottom of the chamber and passes through the first heat transfer media section to be pre-heated. The flue gas may then be heated to the desired final temperature (e.g., 600 to 1100 deg. F.) by the burners and may mix with ammonia and pass up through the catalyst, which removes some or all of the pollutants. In one embodiment, burners and ammonia distribution in the upper section may not be used in this up-flow cycle. Flue gas may then pass up through the heat transfer media where the flue gas may transfer the heat to the heat transfer media and exit the single chamber. Flue gas may exit at approximately the same temperature as the inlet temperature.

In the down-flow cycle, flue gas enters through the top of the single chamber and passes downward through the heat transfer media to absorb the heat from heat transfer media to be pre-heated. The flue gas may then be heated to the preferred final temperature (e.g., 600 to 1100 deg. F.) by the burners, and may mix with ammonia, and pass down through the catalyst, which removes some or all of the pollutants. In one embodiment, burners and ammonia distribution in the lower section may not be used in the down-flow cycle. Flue gas may then pass down through the heat transfer media where the flue gas may transfer the heat to the heat transfer media and exit the single chamber. Flue gas may exit at approximately the same temperature as the inlet temperature.

Up-flow and down-flow cycles may be repeated at a desired interval to achieve the heat recovery and pollutant removal at the same time. Final cycle time tuning may depend on the heat transfer media used.

FIG. 1 illustrates a representative Cold Selective Catalytic Reduction system 1 according to an exemplary embodiment. The system 1 is composed of a chamber 2 to pass the flue gas through the cold selective catalytic reduction process as described herein. The chamber 1 includes two or more heat transfer zones 21, two or more heating zones 33, and one or more catalyst reduction zones 41. The multiple heat transfer zones 21 and heating zones 33 are arranged to permit bi-directional flow of the flue gas for catalytic reduction of the flue gas in both directions. The chamber 2 also includes inlets 15 and outlets 17 along with dampers and valves 11 to accommodate the bi-directional gas flow.

In one embodiment, the catalytic reduction process components are housed in a single chamber 21. Embodiments as described herein utilize a single chamber to optimize the catalyst, working space, and structural material. However, as would be understood by a person of skill in the art, the described zones and sections of the chamber may be sub-divided into two or more chambers. The chamber 21 may be a single chamber generally cylindrical, rectangular, square, elliptical, or a combination of these, which may have inlet ducts 15 and outlet ducts 17 directly coupled to the top and bottom of the chamber, respectively. The chamber may be designed to withstand the temperatures associated with the reduction process. For example, the chamber may be of structural steel that is internally lined with a refractory linking, such as brick, castable, ceramic fiber, or a mixture of these. The emissions containing pollutant, such as a flue gas, is processed by the CSCR system in cyclical fashion utilizing a bi-directional air flow producing an up-flow cycle and a down-flow cycle, as described more fully below.

In one embodiment, the chamber 2 houses two or more heat transfer zones 21. These zones include a heat transfer media 20 and 60 to recapture some of the energy required to heat the flue gas for the catalytic reduction. As the dirty flue gas enters the system, the gas passes through one or more of the heat transfer zones 21, thereby pre-heating the gas and requiring less energy to raise the gas to the desired catalytic reduction temperature. As the cleaned flue gas exits the system, the gas passes through one or more of the heat transfer zones 21; thereby depositing its heat to be used by the next cycle. The heat transfer zone 21 captures the heat of the gas so that the cleaned flue gas preferably exits the system approximately at or below the temperature it enters the system. The heat transfer zones may be positioned on opposing sides of the catalyst zone 41 so that the separate zones are alternatively used to cool the exit gas and pre-heat the incoming gas and cool, as described more fully below. The heat transfer media may be any material with sufficient heat transfer properties, such as alumina and silica.

In one embodiment, the chamber 2 houses two or more heating zones 33 to provide the temperature necessary for the selective catalytic reduction. The two or more heating zones may be on opposing sides of the catalyst zone 41 to sufficiently heat the flue gas before entering the catalyst zone 41 while accommodating the bi-directional flow of flue gas through the system.

A chemical reducing agent 35 may also be added to the flue gas within the heating zones 33. The chemical reducing agent 35 is injected into the gas stream before the gas enters the catalyst zone 41, as described below. In an exemplary embodiment, ammonia is used as the chemical reducing agent to reduce NOx, producing Nitrogen and water vapor. The chemical reducing agent 35 may be ammonia in either aqueous or anhydrous form. The chemical reducing agent may be supplied to the chamber through by an injection grid 36 to provide sufficient and even distribution of the chemical throughout the gas stream before entering the catalyst zone. A separate injection grid 36 may be used in each heating zone 33 to supply the chemical reducing agent 35 to the flue gas before it enters the catalyst zone 41 from either direction. The injection system which supplies the injection grid may also be controlled electronically to minimize the amount of un-reacted reducing agent in the gas stream after the reactor. Accordingly, additional monitors, and feedback controls may be used to analyze the cleaned flue gas and control the amount of reducing agent and other reactor parameters, including temperature and residence time. However, the system may not use an ammonia distribution section if the pollutants to be removed do not include Nox, such as a combination of pollutants composed of CO, VOCs and HAPs only.

In one embodiment, the chamber 2 houses one or more chemical catalyst 40. Using a catalyst 40 allows oxidation to occur at around 600 deg. F, instead of the usual 1600 deg. F., saving approximately two-thirds on fuel consumption. Hazardous air pollutants that are organic in nature, for example—poly-cyclic aromatic hydrocarbons (PAH) and solvent vapors—are converted through oxidation to carbon dioxide and water. The heated VOC-laden air is passed through the chemical catalysts, such as for example, a bed of solid catalyst, where the VOCS are rapidly oxidized. Alternate embodiments include a single or multiple beds within the chamber of the CSCR system. The chemical catalyst 40 may chosen depending on the pollutants within the passed air stream. For example, systems used to oxidize VOCs may use a metal oxide, such as nickel oxide, copper oxide, manganese dioxide, or chromium oxide. Nobel metals such as platinum and palladium may also be used. The chemical catalyst 40 may be located within the catalyst zone 41 within the chamber 2. The catalyst zone 41 may be located after the heating zones 33 to permit sufficient heating of the dirty flue gas before entering the catalyst 40.

Embodiments as described herein, may also include an air pollution control system. Dusts, mists, and SOx/H2S can all reduce the activity of the catalyst. Dusts and mists can plug the pores of the catalyst support, blocking off the active sites. Sulfur and heavy metals can react with the catalyst, effectively poisoning the catalytic process by forming new compounds and alloys which lack catalytic reactivity. The system may therefore include dust collection and flue gas treatment systems before the flue gas enters the chamber 2. Additionally or alternatively, guard-beds of catalyst support material which have not been dosed with the metallic catalyst may be used to polish out the stray materials which bypass upstream dust collection and flue gas treatment steps. In one embodiment, the heat transfer media may act as a filter to protect the plugging of the catalyst. Heat transfer media may be configured to plug before the catalyst, thereby protecting the expensive catalyst. The catalyst may cost more than 10 times the cost of the heat transfer media.

Figure 2:
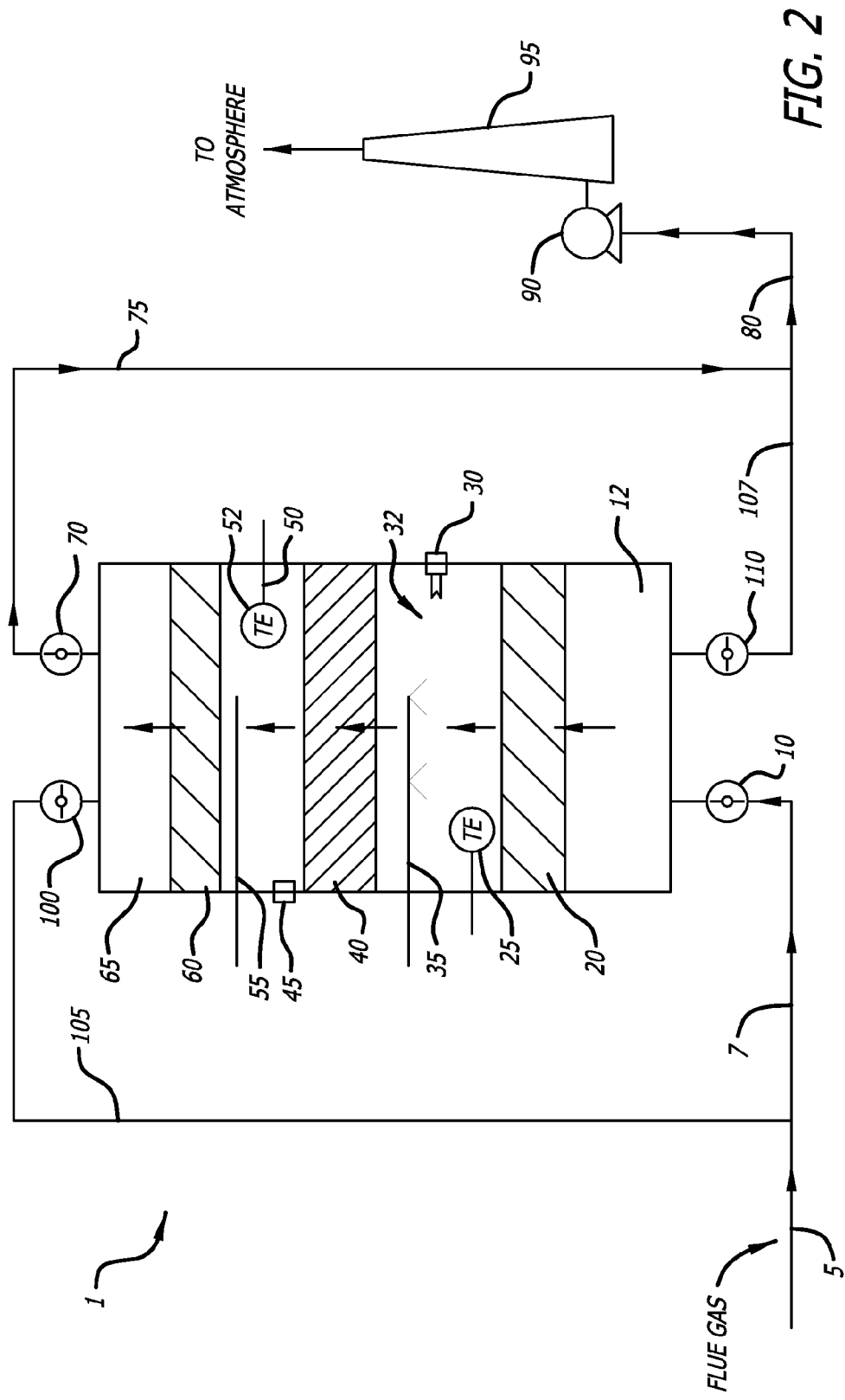
FIG. 2 illustrates a diagrammatic representation of an up-flow cycle in a Cold Selective Catalytic Reduction system according to embodiments as described.
Figure 3:
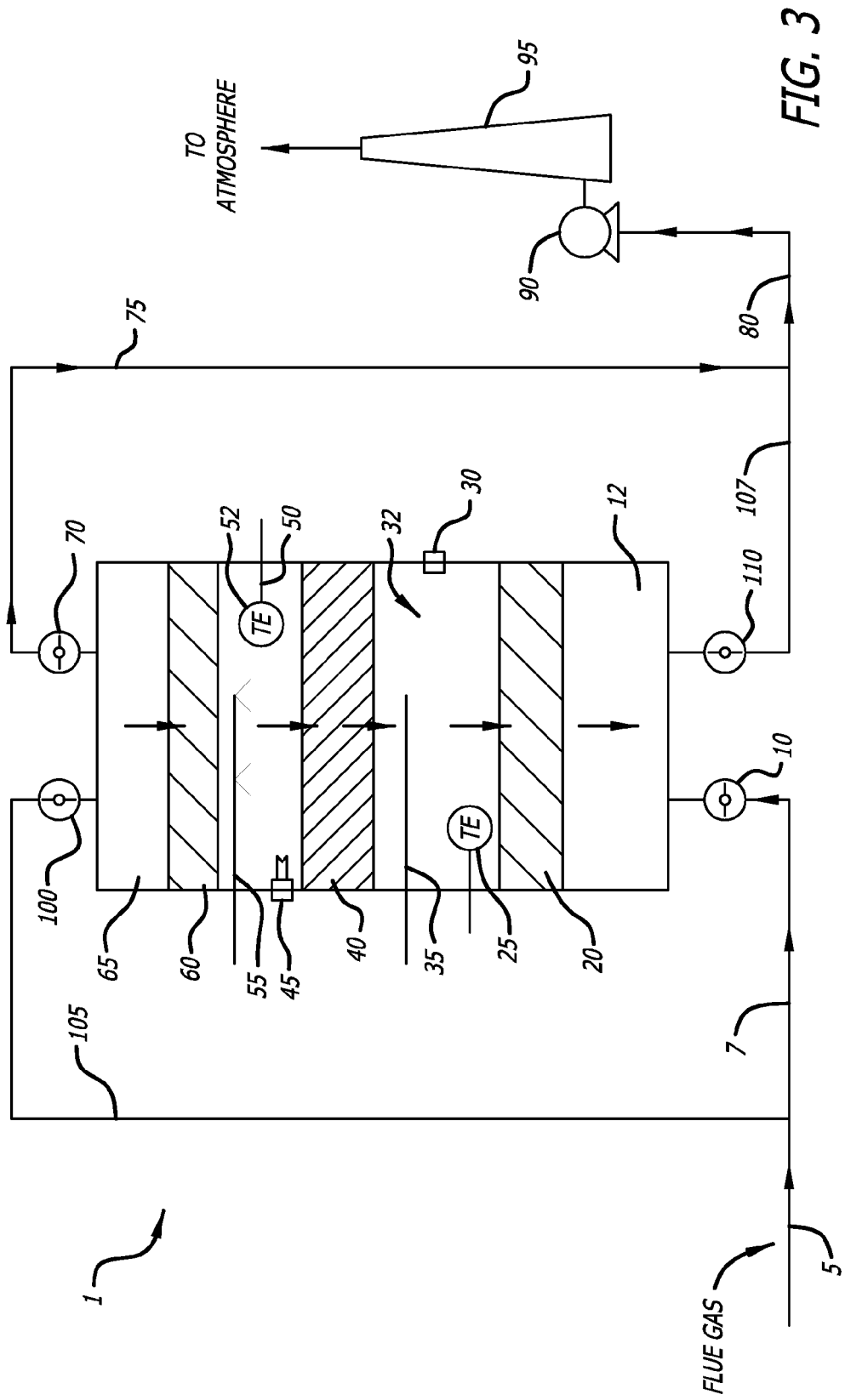
FIG. 3 illustrates a diagrammatic representation of a down-flow cycle in a Cold Selective Catalytic Reduction system according to embodiments as described.

FIGS. 2 and 3 illustrate a representative Cold Selective Catalytic Reduction method of using the Cold Selective Catalytic Reduction system 1 according to embodiments as described herein. Referring to FIG. 2, illustrating a representative up-flow cycle, the flue gas enters the ductwork 5 and continues through the ductwork 7. The flue gas from ductwork 7 enters through the damper 10 into section 12 of the single chamber. The flue gas from section 12 passes up through a first heat transfer media section 20 and is preheated. The flue gas then passes up through section 32 where it is heated to a preferred final temperature, such as, for example 600-1100 deg. F., by the burners 30 and mixes with ammonia 35. The temperature may be controlled by thermocouple 25. The flue gas next passes up through the NOx, CO, VOCs and HAPs catalyst 40. All or substantially all of the pollutants are removed by the catalyst 40. In one embodiment, the flue gas then passes up through section 52, and the burners 45, ammonia 55 and thermocouple 50 may not be used in this up cycle. Flue gas then passes up through the second heat transfer media section 60 where the flue gas may transfer the heat to the heat transfer media and pass up through section 65 of the single chamber. The flue gas then exits section 65 through damper 70. The flue gas from the damper 70 may continue through ductwork 75. The flue gas from ductwork 75 may continue through ductwork 80. The flue gas from ductwork 80 may enter the centrifugal fan 90 and finally into the stack 95 to be discharged to atmosphere. The centrifugal fan 90 may provide the motive force for the flue gas from ductwork 5 through the single chamber through ductwork 80 and final discharge through the stack 95.

After the completion of the up-flow cycle, which may take, for example, 1-10 minutes, the down-flow cycle can be performed. For the down-flow cycle to start, the damper 10 transitions to a closed position, damper 100 transitions to an open position, damper 70 transitions to a closed position, and damper 110 transitions to an open position.

Referring to FIG. 3, illustrating a representative down-flow cycle, the flue gas enters the ductwork 5 and continues through the ductwork 105. The flue gas from ductwork 105 enters through the damper 100 into section 65 of the single chamber. The flue gas from section 65 passes down through the second heat transfer media 60 and is pre-heated. The flue gas then passes down through section 52 where it may be heated to the preferred final temperature, such as for example, 600-1100 deg. F., by the burners 45 and mixed with ammonia 55. The temperature may be controlled by thermocouple 50. The flue gas then passes through the NOx, CO, VOCs and HAPs catalyst 40. All or substantially all of the pollutants may be removed by the catalyst 40. In one embodiment, the flue gas passes down through section 32 and the burners 30, ammonia 35 and thermocouple 25 may not be used in this down cycle. Flue gas may then pass down through the first heat transfer media 20 where the flue gas may transfer the heat to the heat transfer media and pass down through section 12 of the single chamber. The flue gas then exits section 12 through damper 110. The flue gas from the damper 110 may continue through ductwork 107. The flue gas from ductwork 107 may continue through ductwork 80. The flue gas from ductwork 80 may enter the centrifugal fan 90 and finally into the stack 95 to be discharged to atmosphere. The centrifugal fan 90 may provide the motive force for the flue gas from ductwork 5 through the single chamber through ductwork 80 and final discharge through the stack 95.

After the completion of the down-flow cycle, which may take, for example, 1-10 minutes, another up-flow cycle may start. For the up-flow cycle to start, the damper 10 transitions to an open position, damper 100 transitions to a closed position, damper 70 transitions to an open position, and damper 110 transitions to a closed position. Up-flow and down-flow cycles may be repeated, for example, every 1-10 minutes to achieve heat recovery and simultaneously remove some or all of the pollutants from the emission feed.

According to various embodiments of the system, different operating parameters and results may be obtained or achieved. For example, the CSCR system and method may be applicable for flue gas at a temperature from ambient to 500 plus deg. F. The CSCR system and method may use less than 5% of the heat required to catalytically remove NOx, CO, VOCs and HAPs by heating the flue gas to the preferred final temperature (600-1100 deg. F.). In one embodiment, the CSCR system and method may remove greater than 90% of NOx and greater than 95% of CO, VOCs and HAPs.

According to various embodiments of the system, the CSCR system does not have to be installed adjacent to the temperature zone of 500-700 deg. F. It can be installed to site specific space availability. Temperature loss in the CSCR system during the associated method may have no effect on the pollutants removal efficiency. In one embodiment, the CSCR system can be installed while a process system is in operation such that only a tie-in may be required into the process system to start operating the CSCR system and method.

Embodiments, as described herein, may be applied to handle emissions from multiple process streams resulting in fluctuating flue gas temperature from ambient to less than 500 deg. F., while maintaining the pollutants removal efficiency. For example, using regenerative heat recovery, as described herein, is a practical method for combining multiple effluent gas streams into a single feed stream, allowing one unit to treat a facility or process unit. Embodiments as described herein, can save as much as 95% is fuel consumption, for only a 6% increase in power use, when compared to conventional SCR units.

What is claimed is:

1. A system for removing a constituent from a fluid stream, comprising:
    a first pre-heating zone;
    a constituent removal zone separate from the pre-heating zone, the constituent removal zone comprising a first heating zone separated from a second heating zone; and
    a second pre-heating zone separated from the first pre-heating zone by the constituent removal zone.

2. The system of claim 1, wherein the system passes the fluid stream on a first cycle through the first pre-heating zone before passing the fluid stream through the constituent removal zone and the second pre-heating zone, and wherein the system passes the fluid stream on a second cycle through the second pre-heating zone before passing the fluid stream through the constituent removal zone and the first pre-heating zone.

3. The system of claim 2, wherein the system cyclically passes the fluid stream through the first cycle and the second cycle such that the fluid stream from the first cycle passing through the second pre-heating zone provides heat to the second pre-heating zone to heat the fluid stream passing through the second pre-heating zone from the second cycle, and the fluid stream from the second cycle passing through the first pre-heating zone provides heat to the first pre-heating zone to heat the fluid stream passing through the first pre-heating zone from the first cycle.

4. The system of claim 3, wherein the system is configured to activate the first heating zone when the fluid stream is on the first cycle, and is configured to activate the second heating zone when the fluid stream is on the second cycle.

5. The system of claim 4, wherein the constituent removal zone comprises a catalyst.

6. The system of claim 5, wherein the catalyst comprises a metal oxide.

7. The system of claim 5, wherein the constituent removal zone comprises an injection system to introduce a chemical reducing agent into the fluid stream.

8. The system of claim 7, wherein the chemical reducing agent is ammonia.

9. The system of claim 5, wherein the first and second at heating zones are separated by the catalyst.

10. A method of removing a constituent from a fluid stream, comprising:
    on a first cycle:
        pre-heating the fluid stream by passing the fluid stream through a first heat transfer zone before
        removing at least one constituent from the fluid stream by passing the fluid stream through a constituent removal zone having a first heating zone; and
    on a second cycle:
        pre-heating the fluid stream by passing the fluid stream through a second heat transfer zone separate from the first heat transfer zone before
        removing at least one constituent from the fluid stream by passing the fluid stream through the constituent removal zone having a second heating zone separate from the first heating zone.

11. The method of claim 10, wherein the first cycle and second cycle are repeated such that the fluid stream passing through the first cycle provides the heat for pre-heating the fluid stream passing through the second cycle, and the fluid stream passing through the second cycle provides heat for pre-heating the fluid stream passing through the first cycle.

12. The method of claim 11, wherein the constituent removal zone removes the constituent from the fluid stream by elevating a temperature of the fluid stream.

13. The method of claim 12, wherein the constituent removal zone removes the constituent from the fluid stream by passing the fluid stream through a catalyst.

14. The method of claim 13, wherein the constituent removal zone removes the constituent from the fluid stream by injecting a reducing agent into the fluid stream.

15. The method of claim 14, wherein separate injectors are used to introduce the reducing agent into the fluid stream and separate heaters are used to elevate the temperature of the fluid stream of the first cycle and the second cycle.

16. The method of claim 13, wherein the temperature of the fluid stream is elevated by passing the fluid stream of the first cycle through the first heating zone prior to passing the fluid stream through a catalyst zone, and by passing the fluid stream of the second cycle through the second heating zone separate from the first heating zone prior to passing the fluid stream through the catalyst zone.

17. A system to remove pollutants from a fluid stream, comprising:
    a separation zone between a first end of the system and a second end of the system;
    a first heating zone positioned between the separation zone and the first end to heat the fluid stream to between approximately 600 and 1100 degrees Fahrenheit;
    a second heating zone positioned between the separation zone and the second end to heat the fluid stream to between approximately 600 and 1100 degrees Fahrenheit.

18. The system of claim 17, further comprising at least one heat transfer zone to remove heat from the fluid stream exiting the system.

19. The system of claim 17, wherein the separation zone comprises a catalyst bed.

20. The system of claim 19, further comprising an injection system within each of the first heating zone and second heating zone to supply a chemical agent to the fluid stream prior to passing through the separation zone.

* * * * *